No. 804,850. PATENTED NOV. 21, 1905.
C. L. IRESON.
ARTICLE OF MANUFACTURE COMPRISING LEATHER AND RUBBER BODIES.
APPLICATION FILED MAR. 3, 1905.
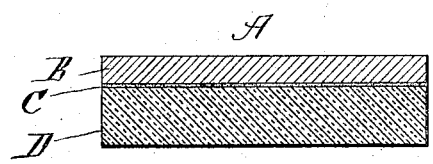
Witnesses
M. E. Flaherty
M. V. Foley.
Inventor
Charles L. Ireson
by his attys
Clark, Raymond & Cook

UNITED STATES PATENT OFFICE.

CHARLES L. IRESON, OF BOSTON, MASSACHUSETTS.

ARTICLE OF MANUFACTURE COMPRISING LEATHER AND RUBBER BODIES.

No. 804,850.      Specification of Letters Patent.      Patented Nov. 21, 1905.

Application filed March 3, 1905. Serial No. 248,281.

*To all whom it may concern:*

Be it known that I, CHARLES L. IRESON, a citizen of the United States, residing at Boston, in the county of Suffolk and State of Massachusetts, have invented a new and useful Article of Manufacture Comprising a Leather and Rubber Body, of which the following is a full, clear, and exact description, reference being had to the accompanying drawing, forming a part of this specification, in explaining its nature.

The invention consists in a new article of manufacture which comprises a tanned section or body of leather, a section or body of rubber previously formed by heat vulcanization, and an intermediate uniting-section between the leather and rubber vulcanizing both continuously and permanently together and uniting with the sections of both adjacent to each other, which uniting-section is formed at atmospheric pressure by means of sulfur contained in the leather, rubber-cement between the leather section and the rubber section, and a vulcanizing agent for it adapted to vulcanize it and the adjacent sections of the leather and the rubber at atmospheric temperature.

The purpose of the invention is to provide an article adapted for many uses which shall have when combined into one the qualities and advantages of both the leather and of the rubber and at their best or as they exist before they are so united. A product of this character having these properties and being practically homogeneous throughout so far as the strength of the union is concerned is required for many purposes in which either the leather section or the rubber section may be the outermost, according to the use to which it is put. For instance, as a bicycle-tire it may be used in either way and desirable results secured from such use.

In manufacturing the product a tanned leather having or containing sulfur for assisting in the subsequent vulcanization of the bond is taken as one of the bodies. The sulfur may be introduced during tanning or subsequently, and it should thoroughly permeate the leather, and especially that section of it adjacent to the rubber. The rubber body is a rubber that has previously been fixed by heat vulcanization. The surface of each of the bodies which are to lie against each other or to be combined is coated with a thin coating of rubber-cement, and to said cement coating there is then applied a coating of a vulcanizing agent which will vulcanize at atmospheric temperature, preferably protochlorid of sulfur and benzin or naphtha, and the two bodies thus prepared are then united with each other at atmospheric temperature under pressure by cold vulcanization, the bond of union which is thus obtained serving to firmly knit both bodies continuously together with a strength which is greater than that of the rubber.

In the drawing the figure represents in section the composite article.

Referring to the drawing, A represents the new product, of which B is the leather component, C the rubber component, and D the intermediate bond of union between them.

I have shown the leather and rubber in flat form and not reduced to a shape which fits the product for any particular use, and it will be understood that the invention is adapted to be applied to any use to which such a product is fitted.

Having thus fully described my invention, I claim and desire to secure by Letters Patent of the United States—

1. The new article of manufacture herein described, the same comprising a composite product of tanned leather containing sulfur, rubber previously vulcanized by heat, and a cold vulcanized uniting-section between them combined with and knit into the section of the leather and the section of the rubber adjacent to it.

2. The improved article of manufacture comprising a body of leather containing sulfur, a body of rubber vulcanized by heat, and an intermediate, uniting body, cold vulcanized with the leather and with the rubber.

CHARLES L. IRESON.

Witnesses:
F. F. RAYMOND, 2d,
M. E. FLAHERTY.